United States Patent [19]

Truman

[11] Patent Number: 5,156,064
[45] Date of Patent: Oct. 20, 1992

[54] CABLE LENGTH ADJUSTMENT DEVICE

[75] Inventor: Mark R. Truman, Washington, Mich.

[73] Assignee: Handy & Harman Automotive Group, Inc., Auburn Hills, Mich.

[21] Appl. No.: 703,551

[22] Filed: May 21, 1991

[51] Int. Cl.⁵ ............................................. F16C 1/10
[52] U.S. Cl. .................... 74/501.5 R; 74/502.6; 403/106; 417/417; 417/437
[58] Field of Search ............... 74/501.5 R, 502, 502.4, 74/502.6, 473, 586; 403/105, 106, 118, 348, 320; 411/417, 437, 432

[56] References Cited

U.S. PATENT DOCUMENTS

| | | | |
|---|---|---|---|
| 3,572,159 | 3/1971 | Tschanz | 74/502.5 |
| 3,710,645 | 1/1973 | Bennett | 74/502.4 |
| 4,141,117 | 2/1979 | Van Gompel . | |
| 4,177,681 | 12/1979 | Wess | 403/118 X |
| 4,294,133 | 10/1981 | Hurley | 74/502.4 |
| 4,418,583 | 12/1983 | Taig | 74/501.5 R |
| 4,635,498 | 1/1987 | Zimmermann et al. | 74/502.4 |
| 4,658,668 | 4/1987 | Stocker . | |
| 4,676,119 | 6/1987 | Spease . | |
| 4,696,372 | 9/1987 | Fields . | |
| 4,699,330 | 10/1987 | Barazone . | |
| 4,799,400 | 1/1989 | Pickell . | |
| 4,833,937 | 5/1989 | Nagano | 74/502.6 X |
| 4,841,805 | 6/1989 | Italiano . | |
| 4,841,806 | 6/1989 | Spease . | |
| 4,850,240 | 6/1989 | White . | |
| 4,852,425 | 8/1989 | Stocker | 403/105 X |
| 4,854,185 | 8/1989 | Lichtenberg et al. . | |
| 4,854,186 | 8/1989 | Jakob et al. . | |
| 4,869,123 | 9/1989 | Stocker . | |
| 4,903,541 | 2/1990 | Shiota | 74/501.5 R |
| 4,936,161 | 6/1990 | Polando . | |
| 4,957,017 | 9/1990 | Corbett . | |
| 4,958,536 | 9/1990 | Baumgarten . | |
| 4,987,793 | 1/1991 | Baumgarten et al. . | |
| 5,015,023 | 5/1991 | Hall . | |

Primary Examiner—David A. Scherbel
Assistant Examiner—Winnie Yip
Attorney, Agent, or Firm—Pennie & Edmonds

[57] ABSTRACT

A cable length adjustment device comprising an elongated member, a locking member formed to prevent translatory movement of the elongated member when in a first locked position, and allow for translatory movement of the elongated member in a second unlocked position, and a housing substantially encasing the locking member.

20 Claims, 3 Drawing Sheets

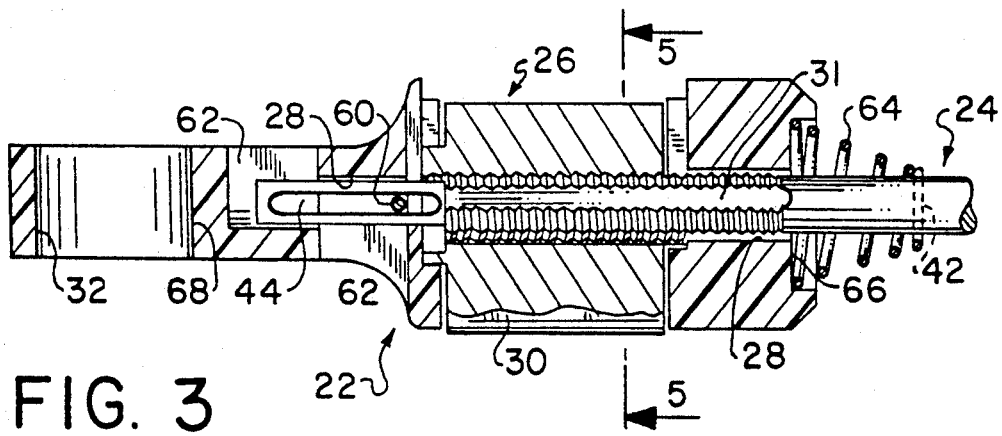
FIG. 3
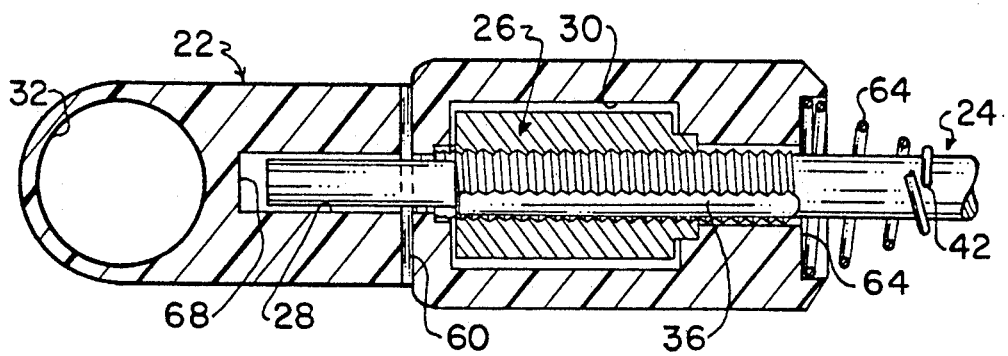
FIG. 4
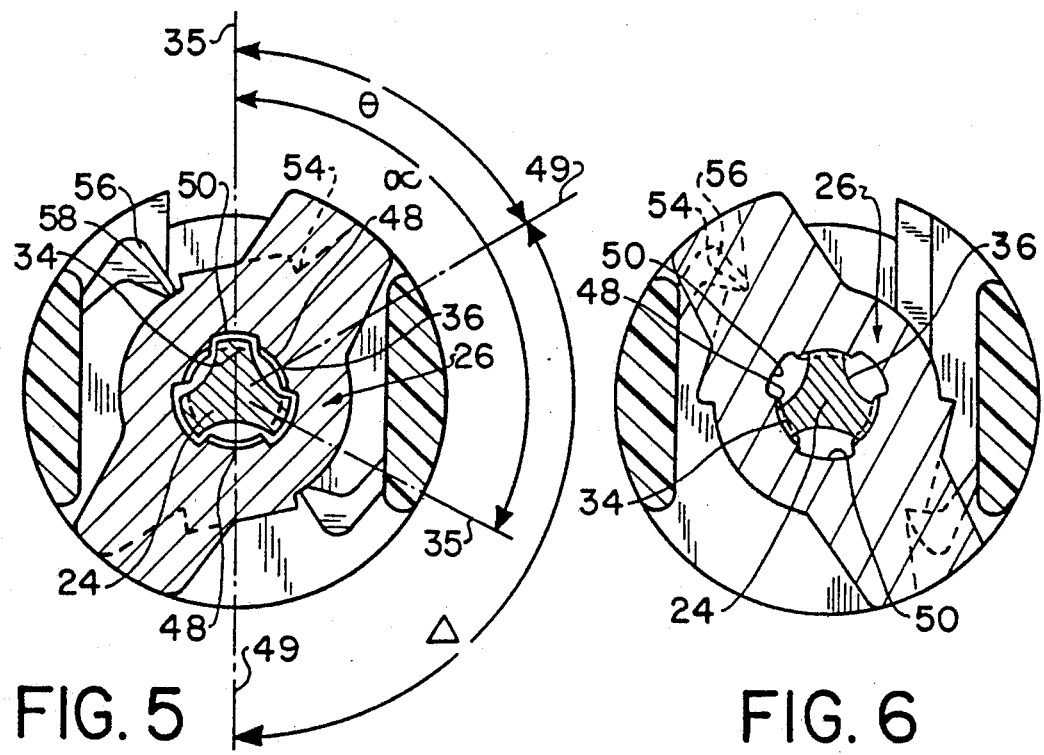
FIG. 5
FIG. 6

CABLE LENGTH ADJUSTMENT DEVICE

BACKGROUND OF THE INVENTION

The invention relates to a cable length adjustment device, and more particularly to a device suitable for length adjustment in an automatic transmission cable.

In an automatic transmission of an automobile, a cable is utilized to connect a translatable gearshift mechanism to a set of transmission gears so that selection of a predetermined position of the gearshift mechanism corresponds to selecting a particular gear in the transmission. Thus, the correct transmission cable length is essential to the proper operation of an automatic transmission.

To ensure that the transmission cable is a proper operating length, cable length adjusters are utilized to perform fine adjustment. A cable length adjuster generally comprises an elongated member attached at one end to the transmission cable and at the other end to the gearshift mechanism. A locking member is provided which is mounted on the elongated member in a manner which, when unlocked, allows for sliding movement between the elongated member and the locking member and when locked, prevents movement of the elongated member with respect to the locking member. Adjustment means are provided which allow the locking member to engage the elongated member in predetermined increments along the elongated member. Examples of such adjusters include U.S. Pat. Nos. 4,418,583, 3,710,645 and 3,572,159.

Unfortunately, the above-described cable length adjusters generally do not provide a fine adjustment means suitable for the purpose: Specifically, access to the locking member is limited because of the design of the adjuster, and the adjustment increments are typically too large to accommodate the transmission cable length discrepancies. Further, the adjusters are constructed of a plastic material which does not meet new automobile engine design requirements of temperature and strength.

SUMMARY OF THE INVENTION

According to the invention, the cable length adjustment device comprises a substantially cylindrical housing having a bore formed through its longitudinal axis. An aperture is formed through the diameter of the housing to define a cavity within the housing. Means are also provided for attaching the device to the appropriate part of the automobile. An elongated member is positioned in the bore of the housing so that it has translational motion with respect to the housing, but it is prevented from having rotational motion.

A locking member is provided within the cavity formed in the housing. The locking member includes a bore formed to receive the elongated member and allow for rotation thereabout. Access to the locking member is obtained on either side of the housing via the aperture. Thus, the locking member can be rotated by an operator from either side of the housing. When rotated to a locking position, the locking member engages the elongated member so as to prevent translational motion of the elongated member with respect to the housing.

In a preferred embodiment, the elongated member has exterior arcuate threads machined around its circumference which are formed to mate with corresponding interior arcuate threads machined in the bore in the locking member. The arcuate threads are separated circumferentially by wells in both the elongated member and the locking member. Thus, when the threads of one member are aligned with the wells of the other member, the elongated member can translate relative to the housing. However, when the locking member is rotated to its locking position, the threads mesh preventing translational motion, thereby locking the elongated member to the housing. The housing is made from a plastic material, the elongated member and the locking member are made from metals.

The advantages of the cable length adjustment device of the invention include the following. The arcuate threads formed on the exterior of the elongated member and the interior of the locking device are fine straight threads defining small adjustment increments. The device is constructed of strong, heat resistant materials capable of withstanding modern engine designs. Further, the device is easier to install because the locking member is accessible to an installer from two sides. Thus, when the device is placed in an automobile and is surrounded by other automobile parts, the installer can adjust the transmission cable length from the side providing him the most clearance space.

BRIEF DESCRIPTION OF THE DRAWINGS

FIG. 3 is a cross-sectional view taken at 3—3 of FIG. 2 with the adjustment device in assembled state;

FIG. 4 is a cross-sectional view taken at 4—4 of FIG 2 with the adjustment device in assembled state;

FIG. 5 is a cross-sectional view taken at 5—5 of FIG. 3 with the locking member in an unlocked position; and FIG. 6 is a cross-sectional view similar to FIG. 5 with the locking member in a locked position.

DETAILED DESCRIPTION OF THE INVENTION

Figure 1:
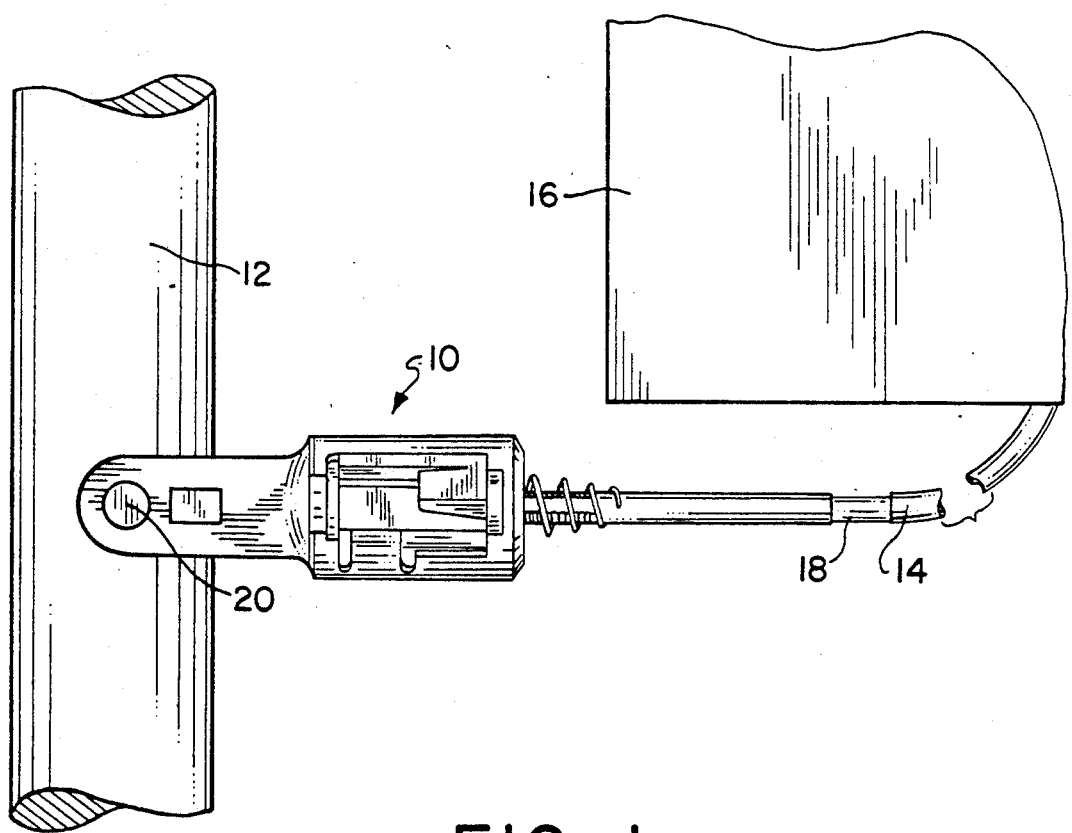
FIG. 1 is an illustration of the adjustment device of the invention connected to a transmission and gearshift.
Figure 2:
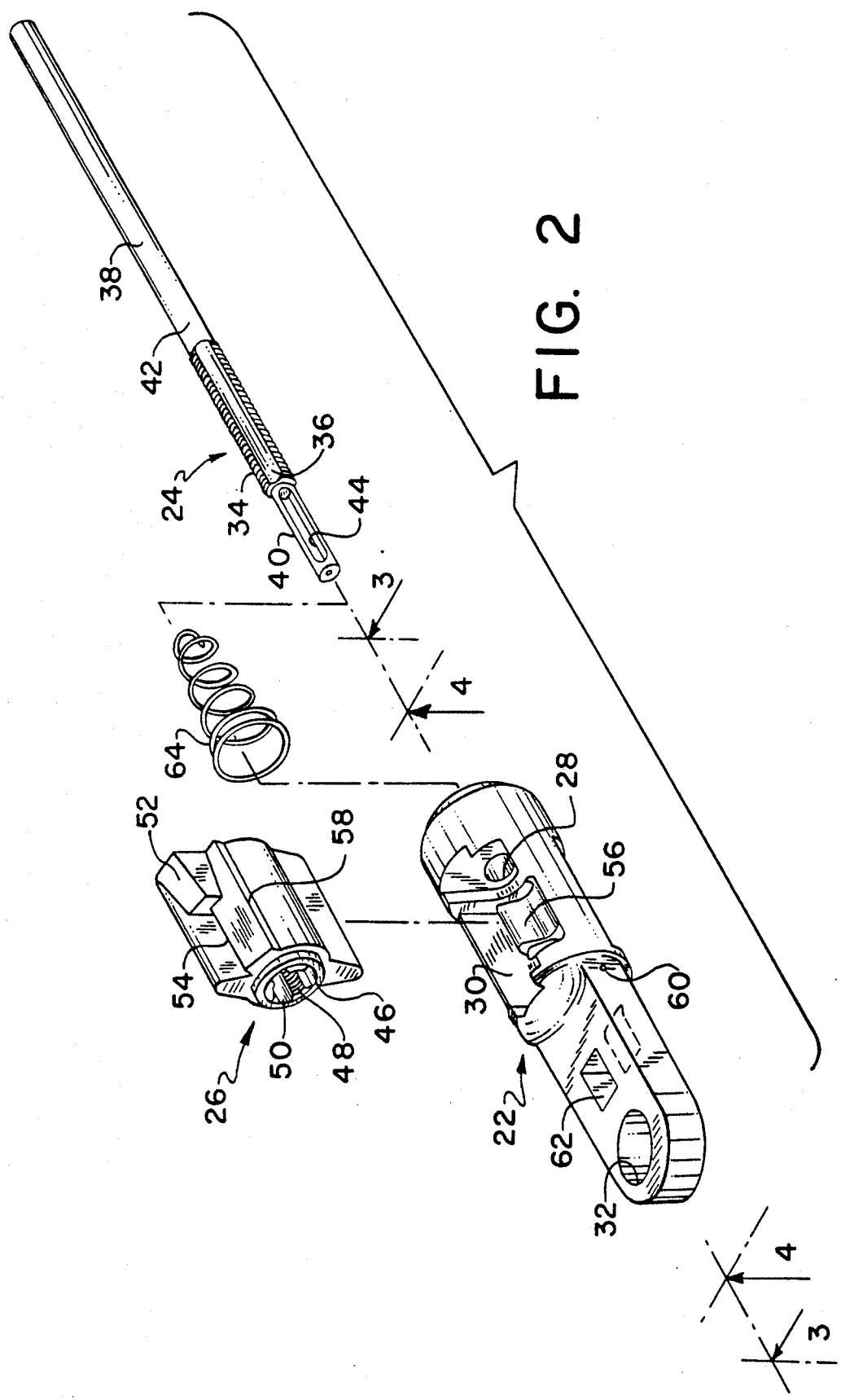
FIG. 2 is an exploded view of the adjustment device of the invention.

The cable length adjustment device, generally designated 10 in FIG. 1, is connected at one end to a gearshift 12 of the automobile and at the other end to a transmission cable 14. The transmission cable is ultimately connected to the transmission 16 of the automobile. Translation of the gearshift 12 results in switching of gears located in the transmission 16. The transmission cable 14 is attached to the adjustment device 10 via a crimp ring 18. The adjustment device is connected to the gearshift 12 via a nut and bolt arrangement 20.

The adjustment device comprises a housing 22, an elongated member 24 and a locking member 26.

The housing 22 is formed of a plastic material which can be injection molded. The housing includes a central axial bore 28 formed to accommodate the elongated member 24. Additionally, an aperture 30 is provided through the diameter of the housing to define a cavity within the housing for positioning of the locking member 26. This aperture provides the operator access to either side of the locking member. A bore 32, formed through the housing, allows for connection to the gearshift 12 via the nut and bolt combination 20.

The elongated member 24 is formed from a steel rod. Three sections of exterior arcuate threads 34 are evenly spaced around the circumference of the rod. Specifically, the threaded sections are spaced 120° ($\alpha$) apart from the centerline 35 of the threaded section to the centerline of an adjacent threaded section. The threads comprise individual straight threads, not standard helical threads. These individual threads are axially spaced 0.02 inches apart, thus allowing for a fine adjustment in increments of 0.02 inches. Unthreaded wells 36, which measure approximately the length of the threaded sections 34, are formed between the three threaded sections, thus forming a substantially triangular cross-sectional shape at this portion of the elongated member. The elongated member has reduced diameter portions at both its forward end portion 38 and its rearward end portion 40. The forward end portion 38 includes a small aperture 42 provided for attaching a spring thereto. The rearward end portion 40 includes a longitudinal slot 44 formed through its diameter. These features will be described in more detail below.

One method of manufacturing the elongated member is to machine a continuous circular threaded section on the steel rod and then machine wells 36 spaced 120° apart from the centerline of one well to the centerline of an adjacent well into the threads to form three distinct arcuate threaded sections. Finally, the forward end portion 38 and rearward end portion 40 are turned on a lathe to reduce the diameter, and the additional features are machined on the reduced portions.

The locking member 26 is formed from powder metal which is compacted under pressure and then heated to produce the proper shape. The powder metal locking member has the properties of heat resistance and strength required of modern automobile parts. A bore 46 is formed through the longitudinal axis of the locking member to allow for positioning of the elongated member 24 within the locking member. Interior arcuate threads are formed in the bore of the locking member and comprise three threaded sections 48 spaced 120° ($\Delta$) apart from the centerline 49 of one threaded section to the centerline of an adjacent threaded section and three well sections 50 positioned therebetween. Again, these threads comprise straight threads and not standard helical threads. These threads are formed to mesh with the threads on the elongated member when the locking member is rotated to a locked position, thus preventing relative translational motion between the locking member and the elongated member. However, when the locking member is in its unlocked position (i.e. the threads of the elongated member are not meshed with the threads of the locking member) there is sufficient clearance between the elongated member and the locking member to allow for relative translational motion.

The exterior of the locking member comprises a shape which is the same on its diametrically opposing sides. The shape includes the following features. A thumb tab 52 provides a greater surface area for an installer to utilize when rotating the locking member. A ledge 54 positioned on the locking member cooperates with a hook-like securing means 56 formed integrally with the housing to secure the locking mechanism in a fully rotated locked position. The ledge 54 meets the hook-like securing means 56 in a snap-fit arrangement to ensure that the locking member will remain in a locked position. Additionally, the "snap" signals the installer that the device is locked. Also, a lip 58 is formed on the locking member to maintain the locking member in an unlocked position. Specifically, the hook-like securing means 56 of the housing abuts lip 58 when the locking member is in an unlocked position, thereby preventing relative rotation between the locking member and the housing. This feature is especially useful during shipping for it ensures that the device will not inadvertently lock.

A pin 60 is positioned through the housing and through the longitudinal slot 44 in the elongated member 24, thus securing the elongated member to the housing. This pin permits translational motion in the elongated member but prevents rotational motion with respect to the housing when the device is in an unlocked position. However, when the device is locked, the meshing of the straight threads acts to prevent rotation of the elongated member with respect to the housing.

Windows 62 are provided on the top and bottom surfaces of the housing in an axially staggered orientation, as illustrated in FIG. 3. These windows are formed to facilitate the molding process utilized to manufacture the housing. Specifically, they are formed with curved bottoms matching the circumferential curve of the bore 28. By thus forming windows 62, the axial bore 28 is effectively extended 14 mm into the housing beyond the aperture 30 to define a region for the elongated member to extend into beyond the aperture 30 when retracted. This eliminates the need for forming the bore completely in the interior of the housing. Thus, the mold used to manufacture the housing is simplified, making the injection molding process both easier and cheaper.

A spring 64 is utilized to bias the elongated member axially outwardly through the bore 28 and away from the housing. As is shown in FIGS. 3 and 4, one end of the spring engages against an end wall 66 of the housing while the other end is secured to the elongated member via aperture 42. The spring acts to push the elongated member toward a fully extended position with respect to the housing. However, the position of the elongated member is limited in both directions of translatory motion. When the elongated member is translated outwardly from the housing, the pin 60 in cooperation with the longitudinal slot 44 acts as a stop mechanism to limit the outward motion. Similarly, when the elongated member is translated inwardly toward the housing, the housing itself acts as a stop to limit the motion. Specifically, an interior wall 68 of one of the windows 62 meets the elongated member when the elongated member is in a fully retracted position.

FIGS. 5 and 6 show the relative rotational positions of the locking member 26 with respect to the elongated member 24. In an unlocked position of the locking member, as illustrated in FIG. 5, the exterior threads 34 of the elongated member align with the wells 50 of the locking member, and the interior threads 48 of the locking member align with the wells 36 of the elongated member. Thus, relative translational motion can be performed between the two members. However, when the locking member is rotated 60° ($\Theta$) a locking position, as illustrated in FIG. 6, the exterior threads 34 of the elongated member mesh with the interior threads 48 of the locking member. In this case, translational motion is prevented between the two members and the device is locked.

During assembly of the cable adjustment device, locking member 26 is inserted into the cavity defined by aperture 30. The longitudinal bore 46 of the locking member is axially aligned with the central axial bore 28 of the housing. The elongated member 24 is inserted into the housing and locking member combination so that the arcuate threads 34 of the elongated member align with the wells 50 of the locking member, and vice versa. Pin 60 is inserted through a hole in the housing which is aligned with longitudinal slot 44 of the elongated member. Thus, the elongated member is fixed rotatively to the housing. Spring 64 is fixed on one end in aperture 42 of the elongated member, and on the other end to housing wall 66.

In operation, the device 10 is attached at its ends to the transmission cable and gearshift. In the event that the transmission cable contains slack, the elongated member is translated axially inwardly of the housing in increments of 0.02 inches. When the cable is properly tightened, the locking member is rotated 60° to lock the elongated member to the housing. Specifically, arcuate threads 34 positioned on the exterior surface of elongated member mesh with arcuate threads 48 positioned on the interior surface of the locking member. Thus, the elongated member is prevented from rotational or translational motion with respect to the housing and the chosen length of the transmission cable is maintained. In the event that the cable is no longer maintained in a taught arrangement, the locking member is rotated 60° in the other direction to an unlocked position to separate the arcuate threads. Thus, the elongated member is once again free to translate with respect to the housing. The cable can now be tightened again by the same process as described above.

I claim:
1. A cable length adjustment device comprising:
   (a) an elongated member having first and second ends comprising a plurality of exterior circumferentially spaced threaded portions formed around said first end of said elongated member with unthreaded portions therebetween;
   (b) a housing member having a longitudinally extending bore for receiving and containing said first end of said elongated member for axial translatory movement therein;
   (c) a locking member rotatively mounted within said housing for rotation between a first locked position and a second unlocked position, said locking member having:
      i) a longitudinally extending bore therethrough for receiving said elongated member for selective rotative and translatory movement with respect thereto,
      ii) a plurality of interior circumferentially spaced threaded portions formed to mesh with said exterior threaded portions of said first end of said elongated member when said locking member is in said first position to prevent relative axial translatory movement of the elongated member relative thereto, and
      iii) unthreaded portions between the threaded portions for circumferential alignment with the threaded portions of the elongated member when the locking member is in said second position to permit axial translatory movement of the elongated member relative thereto; and
   (e) said housing member having an aperture formed through a side wall of said housing member defining a cavity in said housing member for positioning said locking member therein, said aperture providing access to two ends of said locking member.

2. The cable length adjustment device of claim 1 wherein:
   a) said locking member further comprises a ledge; and
   b) said housing member further comprises a hook-like securing means extending into said aperture in said housing member in circumferentially facing relation to said ledge, said hook-like securing means formed to mate with said ledge to maintain said locking member in a snap-fit arrangement in said first locked position.

3. The cable length adjustment device of claim 2 wherein said locking member further comprises a lip formed to cooperate with said hook-like securing means to prevent relative rotative movement of said locking member with respect to said housing member when said locking member is in said second unlocked position.

4. The cable length adjustment device of claim 1 wherein said locking member is positioned in said aperture of said housing member, and said elongated member is positioned in said longitudinally extending bore in said housing member and said longitudinally extending bore in said locking member.

5. The cable length adjuster of claim 1 wherein said locking member further comprises a thumb tab formed to provide an installer a greater surface area with which to promote rotative movement of said locking member with respect to said elongated member.

6. The cable length adjustment device of claim 1 wherein said elongated member comprises three exterior arcuate threaded portions formed to mesh with three interior arcuate threaded portions on said locking member.

7. The cable length adjustment device of claim 6 wherein each of said three exterior arcuate threaded portions of said elongated member has a centerline with each exterior threaded portion spaced 120° apart from its centerline to the centerline of an adjacent exterior threaded portion, and each of said three interior arcuate threaded portions of said locking member has a centerline with each interior threaded portion spaced 120° apart from its centerline to the centerline of an adjacent interior threaded portion.

8. The cable length adjustment device of claim 7 wherein said exterior threaded portions of said elongated member mesh with said interior threaded portions of said locking member when said locking member is rotated 60° from an unlocked position to a locked position.

9. The cable length adjustment device of claim 1 wherein said arcuate threaded portions of said elongated member include arcuate threads spaced axially 0.02 inches apart on said elongated member.

10. The cable length adjustment device of claim 1 wherein said unthreaded portions on said elongated member and said unthreaded portions on said locking member comprise wells.

11. The cable length adjustment device of claim 1 further comprising a spring utilized to bias said elongated member away from said housing member.

12. The cable length adjustment device of claim 1 wherein said housing member further comprises a plurality of windows formed to define a portion of said longitudinally extending bore in said housing member.

13. The cable length adjustment device of claim 1 further comprising a pin formed to cooperate with said elongated member and said housing member so as to prevent relative rotative movement between said elongated member and said housing member, and to limit relative translatory movement between said elongated member and said housing member.

14. The cable length adjustment device of claim 13 wherein said elongated member further comprises a longitudinal slot which cooperates with said pin.

15. The cable length adjustment device of claim 1 wherein said elongated member is constructed of steel.

16. The cable length adjustment device of claim 1 wherein said locking member is constructed of powder metal.

17. The cable length adjustment device of claim 1 wherein said housing member is constructed of plastic.

18. The cable length adjustment device of claim 1 wherein the locking member is rotatively mounted within the bore of said housing.

19. A cable length adjustment device comprising:
 (a) a solid elongated member comprising a plurality of exterior circumferentially spaced threaded portions formed around said elongated member, and unthreaded portions therebetween;
 (b) a housing member for receiving said elongated member for axial translatory movement and rotative movement therein; and
 (c) a locking member rotatively mounted within said housing for rotation between a first locked position and a second unlocked position, said locking member having:
  i) a longitudinally extending bore therethrough for receiving said elongated member for selective rotative and translatory movement with respect thereto,
  ii) a plurality of interior circumferentially spaced threaded portions formed to mesh with said exterior threaded portions of said elongated member when said locking member is in said first position to prevent relative axial translatory movement of the elongated member relative thereto, and
  iii) unthreaded portions between the threaded portions for circumferential alignment with the threaded portions of the elongated member when the locking member is in said second position to permit axial translatory movement of the elongated member relative thereto.

20. A cable length adjustment device comprising:
 (a) an elongated member comprising a plurality of exterior circumferentially spaced threaded portions formed around said elongated member, and unthreaded portions therebetween;
 (b) a housing member for receiving said elongated member for only axial translatory movement and rotative movement therein; and
 (c) a locking member rotatively mounted within said housing for rotation between a first locked position and a second unlocked position, said locking member having;
  i) a longitudinally extending bore therethrough for receiving said elongated member for selective rotative and translatory movement with respect thereto,
  ii) a plurality of interior circumferentially spaced threaded portions formed to mesh with said exterior threaded portions of said elongated member when said locking member is in said first position to prevent relative axial translatory movement of the elongated member relative thereto, and
  iii) unthreaded portions between the threaded portions for circumferential alignment with the threaded portions of the elongated member when the locking member is in said second position to permit axial translatory movement of the elongated member relative thereto.

* * * * *